United States Patent
Swoboda

(10) Patent No.: US 6,795,879 B2
(45) Date of Patent: Sep. 21, 2004

(54) APPARATUS AND METHOD FOR WAIT STATE ANALYSIS IN A DIGITAL SIGNAL PROCESSING SYSTEM

(75) Inventor: Gary L. Swoboda, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 242 days.

(21) Appl. No.: 09/924,912

(22) Filed: Aug. 8, 2001

(65) Prior Publication Data

US 2003/0033552 A1 Feb. 13, 2003

(51) Int. Cl.$^7$ .................................................. G06F 5/00
(52) U.S. Cl. .............................. 710/59; 710/5; 710/15
(58) Field of Search ................................ 710/5, 15–19, 710/29, 59

(56) References Cited

U.S. PATENT DOCUMENTS

| | | | | |
|---|---|---|---|---|
| 3,891,974 A | * | 6/1975 | Coulter et al. ............... | 340/172 |
| 5,450,586 A | * | 9/1995 | Kuzara et al. ............... | 395/700 |
| 5,513,372 A | * | 4/1996 | Ong et al. ................... | 395/821 |
| 5,752,048 A | * | 5/1998 | Antol et al. ................. | 395/750 |
| 5,928,355 A | * | 7/1999 | Petolino, Jr. ................ | 712/214 |

* cited by examiner

Primary Examiner—Fritz Fleming
Assistant Examiner—Alan Chen
(74) Attorney, Agent, or Firm—William W. Holloway; W. James Brady; Frederick J. Telecky, Jr.

(57) ABSTRACT

In order to analyze the conditions leading to a stall or a wait state in a digital signal processing unit, READY signals, that are typically applied to the execution unit of a central processing unit, are applied to external conductors. The external conductors are applied to input terminals of a logic "AND" gate. The output terminals of the logic "AND" gate provided a logic "1" in a no-stall condition and a logic "0" in a stall condition. The output signals of the logic "AND" gate are stored in a memory unit and can be retrieved to determine when a stall condition occurred. The external conductors also apply the READY signal to a stall analyzer unit. The stall analyzer unit identifies the specific condition causing the stall condition by which external conductor has the logic "0" signal applied thereto. An indicia of this stall condition is stored in the memory unit. In event that two conditions are present that can result in a stall condition, a priority unit selected the indicia of a stall condition having the longest duration.

14 Claims, 2 Drawing Sheets

APPARATUS AND METHOD FOR WAIT STATE ANALYSIS IN A DIGITAL SIGNAL PROCESSING SYSTEM

BACKGROUND OF THE INVENTION

1. Field of the Invention

This invention relates generally to digital signal processing units and, more particularly, to the wait (or stall) state of the central processing unit. In a wait state, the execution unit of the central processing unit is temporarily inactivated. The present invention provides apparatus and a technique for recording the occurrence of a wait state and identifying the origin of the wait state.

2. Background of the Invention

In order to provide the maximum computational power, a central processing unit should maintain, as nearly as is possible, uninterrupted processing of an instruction stream by the execution unit. Any interruption of the central processing unit, typically referred to a central processing unit stall (state) or wait (state), results in a lowered efficiency and increased program execution time. As a practical matter, several conditions can occur which result in a stall or wait state for the execution unit. When the origin of a stall condition is known, steps can be taken to minimize the probability of the occurrence of condition. Such steps can include the modification of the program to anticipate the condition that produces the stall state.

Typically, the execution unit has a plurality of READY (RDY) signals applied thereto. The READY signals indicate the status of associated apparatus that provide the execution unit with data required for execution of an instruction. When all of the READY signals have a logic state that indicate the associated apparatus is in a condition to complete the execution of an instruction, the execution unit will execute the instruction. However, if one or more or the READY signals do not have the appropriate logic state, the execution unit will wait (stall) until the appropriate logic states are present for all READY signals. Only when all the READY signal lines have the appropriate logic state signals applied thereto will the execution unit begin operation. By way of specific example, the data processing system typically has memory hierarchy. The signal groups having a high probability of being required by the central processing unit are stored in relatively fast (and consequently relatively expensive) memory units typically referred to as cache memory units. The central processing unit will typically attempt to retrieve a required data from the cache memory unit. When the required data is in the cache memory unit, then the instruction sequence can be processed without interruption. However, when the required data is not in the cache memory unit, the required data must be retrieved from a memory location lower in the memory hierarchy. Being lower in the memory hierarchy, additional time will be required to retrieve the required data. When the required data is not found in the cache memory unit, a READY signal having the logic state indicating a cache miss is applied to the execution unit. In the presence of a READY signal indicating a cache miss, the execution unit will enter a stall state until the data is available and the READY signal changes state.

Because of the importance of continuous instruction execution to the efficiency of the data processing system, it would be desirable to relate the occurrence of the wait state to a portion of a software program. It would further be desirable not only to identify the presence of a wait state, but also the reason for the wait state. In the example of the cache miss cited above, the placement and/or sequence of signal groups within a program can altered to enhance the availability of the signal groups when required.

A need has therefore been felt for apparatus and an associated method having the feature that a stall or wait state of the execution unit of a central processing unit is identified. It would be yet a further feature of the apparatus and associated method to provide a record indicating the clock cycles during which the execution unit of the central processing unit was in a wait or stall state. It would be yet another feature of the apparatus and associated method to provide a record identifying the origin of the stall or wait state. It would be yet another feature of the apparatus and associated method to determine which portion of the program resulted in the stall or wait state.

SUMMARY OF THE INVENTION

The aforementioned and other features are obtained, according to the present invention, by coupling a plurality of conductors to selected portions of the central processing unit. The portions of the central processing unit to which the conductors are coupled are selected to provide a logic "0" signal to the execution unit when the central processing unit experiences a stall or wait condition. Each of these plurality of conductors is coupled to an input terminal of a logic "AND" gate. When a stall or wait condition is not present, all of the signals applied to input terminals of the logic "AND" gate are logic "1" signals and a logic "1" signal is applied to the output terminal of the logic "AND" gate. When a stall condition is present, at least one of the pluralities of conducting leads is a logic "0", the output signal of the logic "AND" gate is a logic "0". By storing the logic signal at the output terminal of the logic "AND" gate during each clock cycle, a record can be obtained that designates when a wait state occurred in the central processing unit. In addition to being applied to the input terminals of the logic "AND" gate, the plurality of conducting leads are applied to the input terminals of a stall analyzer unit. In the stall analyzer unit, an indicia of the origin of each stall condition identified by a logic "0" signal of a conducting lead is applied to output terminals of stall analyzer unit. The indicia of the stall condition are stored in a memory unit. According to one embodiment, one indicia is stored for each stall condition even when the stall condition extends over more than one clock cycle. When more than one condition is present in the central processing unit that results in a stall condition, a priority circuit is provided such that the indicia for the stall condition that causes a stall for the largest number of consecutive clock cycles is recorded.

BRIEF DESCRIPTION OF THE DRAWINGS

FIG. 2A is a block diagram of the apparatus shown in FIG. 1A with additional apparatus for providing a record of the origins of the central processing unit stalls, while

DESCRIPTION OF THE PREFERRED EMBODIMENT

1. Detailed Description of the Figures

Figure 1A:
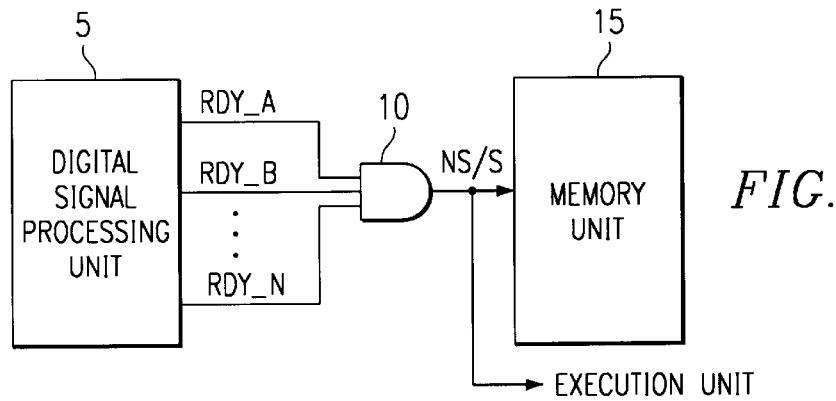
FIG. 1A is block diagram of the apparatus for providing a record of clock cycles during which a central processing unit is inactivated by a stall condition or conditions is shown; while in FIG. 1B, the format of storing this information in a storage unit is shown according to the present invention.
Figure 1B:
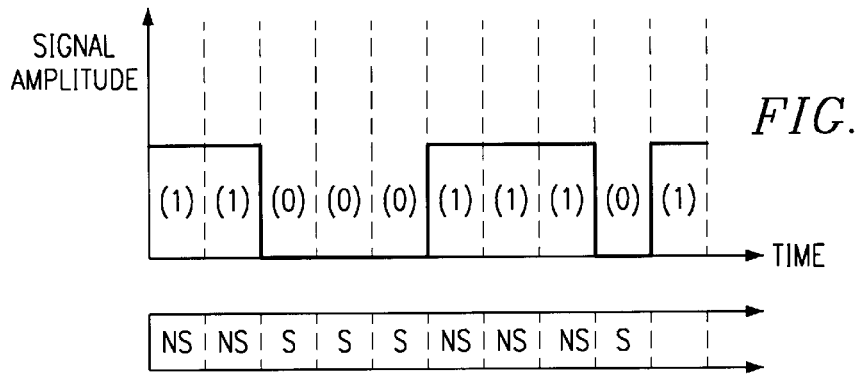

Referring to FIG. 1A, a digital signal processor 5 is shown. Selected components provide READY signals to the execution unit of the central processing unit indicating that the component is ready to participate in the digital signal processor activity. For example, when a memory unit is ready to transfer data, a READY signal is generated. When the READY signal is not present, the operation of the central processing unit is stalled. A RDY_A signal through a RDY_N signals are applied to external leads and external leads are coupled to logic "AND" gate 10. The input terminals of the logic "AND" gate 10 each provide a positive logic signal unless the condition for a stall is present. For example, when a cache miss is identified, a signal is generated to enable the execution unit to stall. That signal, or the logic complement thereof, is applied to a terminal of the logic "AND" gate 10. A "0" logic signal as opposed to a "1" logic signal applied to any input terminal of the logic "AND" gate 10 will result in a "0" logic signal being applied to the output terminal of logic "AND" gate 10. The series of output signals for each clock cycle of the logic "AND" gate 10 are stored in storage unit 15. Referring to FIG. 1B, a representation of the output signal of logic "AND" gate 10 is shown. For each clock cycle, either a "0" logic signal or a "1" logic signal will be generated. The logic "1" signal indicates that the execution unit is executing instructions. The logic "0" signal indicates that execution unit is in the stall or wait state. The series of logic "0" and logic "1" signals can be stored along with a program markers in order to determine where in the program a stall of the processor occurs.

Figure 2A:
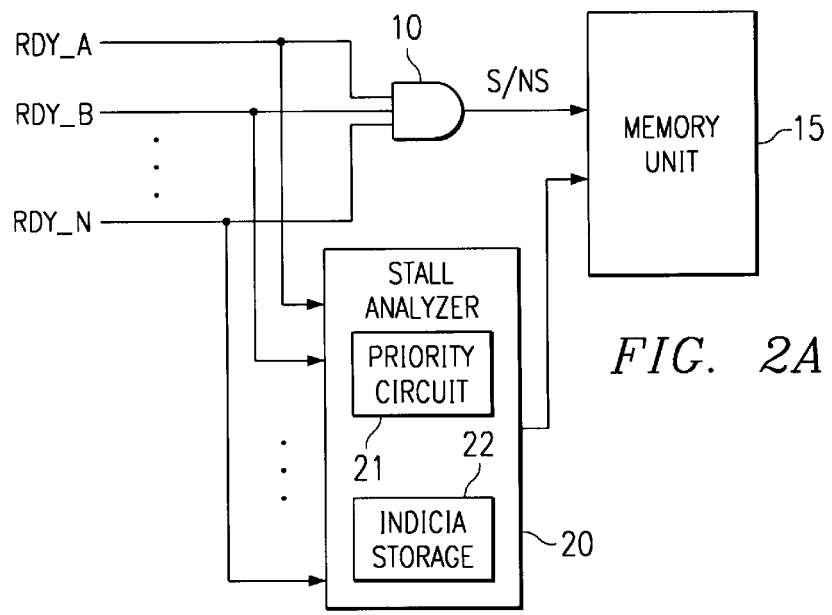
Figure 2B:
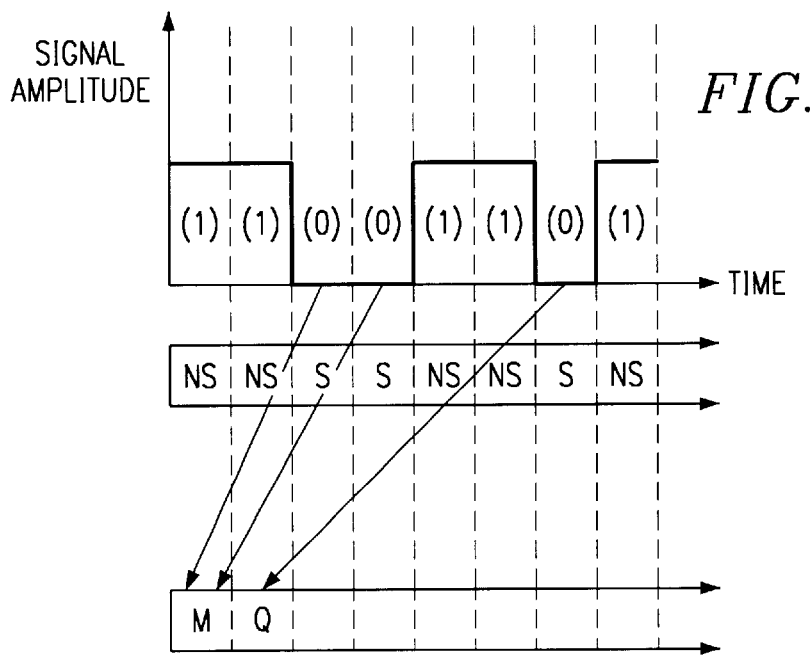
FIG. 2B illustrates the format for storing the stall-identifying information according to the present invention.

Referring to FIG. 2A. the logic "AND" gate 10 of FIG. 1A is shown. The logic "AND" gate has the same signals applied to the input terminals thereof. In addition, each of the input terminals of the logic "AND" gate 10 is coupled to a stall analyzer 20. Stall analyzer 20 provides, based on the READY signal(s) applied to logic "AND" gate 10, an indicia of the input signal(s) that has (have) a logic "0" value associated therewith. For example, when a cache miss is identified, the stall analyzer 20 will generate an "M" signal. The "M" indicia are stored in an indicia storage unit 22. The indicia retrieved from the indicia storage unit 22 is determined by the stall analyzer 20 input terminal having a logic signal indicative of a stall condition. In the event that more than one input terminal has a logic signal indicating a stall condition, then the priority circuit 21 will select the terminal having a stall condition logic signal applied thereto that results in a stall condition lasting the largest number of clock cycles. The priority unit 21 will have the longest stall condition indicia applied to the output terminal. Referring to FIG. 2B, an example of the output signals for logic "AND" gate 10 and stall analyzer 20 are shown. For each clock cycle, the logic "AND" gate generates either a logic "0" or a logic "1" signal as in FIG. 1B. When used in conjunction with program markers, the presence and the number of clock cycles related to the execution unit stall is determined, the stall analyzer 20 generates a signal/signal group when a stall is detected for the processing unit indicative of the origin of the stall condition. In order to conserve memory, the output signals of the stall analyzer that are generated when the stall condition occurs, are stored sequentially. As illustrated in FIG. 2B, a stall condition having the "M" indicia and a stall condition from a different component having the "Q" indicia are stored in a memory unit. The program synchronization markers are used to relate the indicia generated by the stall analyzer 20 and stored in the memory unit with the portion of the program resulting in the stall condition.

Figure 3:
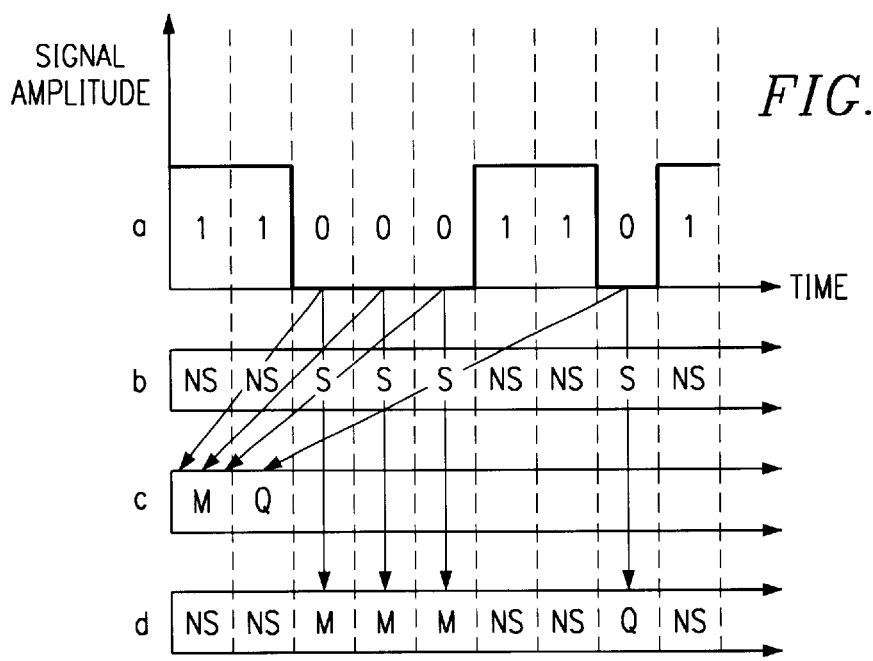
FIG. 3 is similar to FIG. 2B, but includes a less efficient format for storing the stall information according to the present invention.

Referring to FIG. 3, a format for the storage of stall/non stall information similar to that shown in FIG. 2B is shown. In addition, a less storage-efficient format for storing the stall/non-stall information is illustrated. In the added format, an indicia of the status of the prioritized READY signals is added each clock cycle. For each clock cycle in which the READY signals indicate a non-stall condition, a logic signal can be stored in the sequence. For each clock cycle for which the READY signals indicate a stall condition, a signal group identifying the prioritized condition causing the stall condition is stored in the storage unit.

2. Operation of the Preferred Embodiment

With the two types of information provided by the apparatus of the present invention, a comparison can be made between the observed stall states and the program generating the stall conditions. The portions of the software program can frequently be rewritten to reduce the chance for a stall condition. In this manner, the efficiency of the central processing unit can be enhanced. Program synchronization embedded in a sequence of markers can be used to correlate the two data sequences shown in FIG. 2B. For example, the sequence of stall/wait signals shown FIG. 1B can begin at any point in the program execution such as the beginning of the execution of the software program. (Note that additional data sequences with embedded synchronization points can identify program flow or other information.) Therefore, the presence of wait/stall condition can be correlated with execution of the program. Similarly, the stall/wait indicia shown in FIG. 2B have a definite relationship with the stall/wait presence signals shown in FIG. 1B. Therefore, the type of stall/wait condition can be correlated with the software program execution. In the preferred embodiment, the indicia generated by the stall analyzer 20, in the presence of more than one stall condition, will provide the indicia of the condition having the longest duration.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. Apparatus for storing a record of wait states occurring during the operation of a digital signal processor, the digital signal processor having components generating a ready signal having a first logic state resulting in a non-wait condition for an execution unit of the digital signal processor, the components generating the ready signal with a second logic state resulting in a wait condition for the execution unit, the apparatus comprising:

a signal generating unit having a plurality of ready signals applied thereto, the signal generating unit providing a first result signal when all the ready signals applied thereto have a first logic state, the signal generating unit providing a second result signal when at least one of the logic signal applied thereto has a second logic state;

a stall analyzer unit having the ready signals applied thereto, the stall analyzer unit generating a signal group identifying a component generating a ready signal having a second logic state; and a storage unit storing the first result signals and the signal groups generated each clock cycle, wherein the first result signals and the signal groups are stored in a plurality of sequences, wherein a first result signal is stored in a first sequence for each clock cycle having no second logic state ready signals, the second result signal is stored in the first sequence for each clock cycle having at least one second logic state signal.

2. The apparatus as recited in claim 1 wherein the first result signals and the signal groups are stored in a single sequence.

3. The apparatus as recited in claim 1 wherein a signal group is stored in a second sequence for each clock cycle having at least one second logic state ready signal.

4. The apparatus as recited in claim 1 wherein a single signal group is stored in the second sequence for each group of consecutive clock cycles having at least one second state logic signal.

5. The apparatus as recited in claim 1 wherein when two second logic state ready signals are present during a clock cycle, the stall analyzer generating a signal group corresponding to the second logic state signal associated with the greater number of wait clock cycles.

6. The apparatus as recited in claim 1 wherein a program executing on the digital signal processor includes synchronization markers, the synchronization markers permitting the wait states of the digital signal processor to be related to program instructions.

7. A method of relating wait states of an execution unit of a central processing unit to the portions of a program, the method comprising:

when a wait state is present during clock cycle, storing a signal group identifying the origin of the wait state;

when a wait state is not present during a clock cycle, storing a first result signal, wherein storing includes storing the signal groups and the first result signals in a plurality of sequences, wherein storing includes storing the first result signals in a first sequence, the first result signal being stored when no wait state is present during clock cycle, a second result signal being stored in the first sequence when a wait state is present during a clock cycle; and relating the signal groups to instructions in the program.

8. The method as recited in claim 7 wherein storing includes storing the signal groups and the first result signals in a single sequence.

9. The method as recited in claim 7 wherein storing includes storing a signal group in a second sequence during each clock cycle having a wait state.

10. The method as recited in claim 9 wherein storing a signal group includes storing a single signal group for each group of consecutive clock cycles having a wait state.

11. The method as recited in claim 10 wherein each signal group is stored consecutively in the second sequence.

12. The method as recited in claim 7 wherein relating includes using synchronization in the program to relate the program to the wait states.

13. A processing system for relating the instructions of a program to wait (not ready) states of processor, the system comprising:

a processing unit, the processing unit including an execution unit;

a plurality of components, each component generating a selected state logic signal when the generating component is not ready for the execution unit to execute the next instruction;

a signal generating unit having signals from the signal generating components applied thereto, the signal generating unit generating a first result signal when the selected state logic signal is not applied thereto during a clock cycle, the signal generating unit generating a second result signal when the selected state logic signal is applied thereto;

a signal analyzing unit having the signals generated by the components applied thereto, the signal analyzing unit generating a signal group indicative of a component generating the selected state logic signal during each clock cycle; and a storage unit storing the first result signals in a first sequence and storing signal groups generated each clock cycle in a second sequence; wherein, in the second sequence, a single signal group is stored for each group of consecutive clock cycles having the selected state signals, wherein when more than one selected state signals are present during a clock cycle, the stored signal group will identify the selected logic state signal related to the wait state lasting the greater number of clock cycles.

14. The processing system as recited in claim 13, wherein the program includes synchronization markers, the synchronization markers permitting the wait states to be correlated with the program instructions.

* * * * *